United States Patent [19]

Kirby et al.

[11] Patent Number: 5,665,134
[45] Date of Patent: Sep. 9, 1997

[54] LASER MACHINING OF GLASS-CERAMIC MATERIALS

[75] Inventors: Kevin Kirby, Calabasas Hills; Doruk Engin, Pasadena, both of Calif.; Tony Jankiewicz; Joe W. Barber, both of Tucson, Ariz.

[73] Assignee: Hughes Missile Systems Company, Los Angeles, Calif.

[21] Appl. No.: 487,366

[22] Filed: Jun. 7, 1995

[51] Int. Cl.$^6$ ............... C03B 33/00; C03B 32/00; C03B 31/00; C03C 19/00

[52] U.S. Cl. ............... 65/61; 65/102; 65/111; 219/121.6

[58] Field of Search ............... 65/61, 102, 105, 65/111, 112; 219/121.6

[56] References Cited

U.S. PATENT DOCUMENTS 3,940,255   2/1976   Harrington et al. .
4,304,603   12/1981  Grossman et al. .
4,900,892   2/1990   Baeuerle et al. .
5,472,828   12/1995  Akins et al. .

OTHER PUBLICATIONS

Material Removal and Precision Machining of Structural Ceramics Using Nd:YAG Lasers by Nikumb, S.K.; Islam, M.U. Proceedings of the Laser Materials Processing Conference, ICALEO 95, 1995, 168–177.

Laser Machining of Silicon Nitride Base Materials by Campbell, G.R., Islam, M.U. Mater. Manuf. Processes 10(3), 509–18. 1995.

Proceedings of the Laser Materials Proceeding Conference 1993 ND:YAG Laser Assisted Turning System for Ductile Machining of Ceramic Matls Bruce Janvrin 77–86.

*Primary Examiner*—Donald E. Czaja
*Assistant Examiner*—Jacqueline A. Ruller
*Attorney, Agent, or Firm*—Charles D. Brown; Wanda K. Denson-Low

[57] ABSTRACT

Rough machining of a glass-ceramic material article such as a radome is accomplished using a high-power Nd:YAG laser. The radome is rotated about its longitudinal axis, and the point of application of the laser beam is translated generally parallel to the longitudinal axis over either the inside or outside surface of the radome. The Nd:YAG laser preferably operates in a pulsed wave mode with a pulse duration of from about 0.3 to about 3 milliseconds, a pulse frequency of from about 50 to about 500 pulses per second, and a pulse intensity of at least about $3 \times 10^4$ Watts per square centimeter. After laser rough machining, at least about 0.002 inches of material is removed from the rough-machined surface by a finish machining, preferably mechanical grinding.

18 Claims, 5 Drawing Sheets

LASER MACHINING OF GLASS-CERAMIC MATERIALS

BACKGROUND OF THE INVENTION

This invention relates to the machining of glass-ceramic materials, and, more particularly, to the laser machining of glass-ceramic radomes.

Glass-ceramic materials are a well-known class of hybrid materials used in a variety of applications. The glass-ceramic materials are strong at elevated temperatures, are hard and erosion resistant, have good thermal shock resistance, and resist crack propagation. They also exhibit good electromagnetic wave transmission properties, which is of particular importance for their use in radomes for missiles and other applications in high-velocity flight vehicles.

Glass-ceramic materials are fabricated into useful articles by first casting the glass-ceramic at elevated temperature into a mold. The cast material, which optionally may be heat treated, is termed a "blank". For many applications, the blank is thereafter machined to remove its surface layers. Where the final article is a radome or other structure that is to be exposed to a high-velocity air flow, the outwardly facing surface must be very smooth and precisely configured.

Generally conical radomes for high-speed applications have been made of glass-ceramic materials for over 30 years. During that period, sophisticated machining techniques have been developed to remove a total of about 0.100 inches from the inside and outside surfaces of the radome blank to produce the precisely configured final article. These machining techniques are based upon material removal by mechanical grinding of the surfaces. In a typical case, grinding is accomplished using a carborundum or diamond grinding wheel to remove about 0.005 inches per pass with a material feed rate that produces about 0.8 cubic centimeters of material removal per minute.

The machining of the glass-ceramic blank by grinding is relatively slow, requires cooling of the workpiece, and is labor intensive. While this approach is operable, there is need to improve process economics by reducing the time and cost to produce glass-ceramic articles such as radomes. The present invention fulfills this need, and further provides related advantages.

SUMMARY OF THE INVENTION

The present invention provides a method for fabricating glass-ceramic articles, and particularly glass-ceramic radomes. The method yields good-quality articles at a cost of about half that of conventional grinding techniques. The method is non-contact, does not require cooling of the workpiece, and is not labor intensive.

In accordance with the invention, a method for fabricating a glass-ceramic radome includes providing a radome blank made of a glass-ceramic material and having a longitudinal axis. A layer of the glass-ceramic material is rough machined from a rough-machining surface of the radome using a high-power laser as the blank is rotated about its longitudinal axis and with a point of application of the laser beam traversing along the radome blank generally parallel to its longitudinal axis. The rough machining surface may be either the inside surface or the outside surface, or both the inside surface and the outside surface, of the radome blank. After rough machining, the glass-ceramic material is final machined from the rough-machined surface by a final machining technique, preferably mechanical grinding of at least about 0.002 inches of material from the rough-machined surface.

The laser is preferably a Nd:YAG laser operating at 1.06 micrometer output wavelength. The laser may operate in a continuous wave mode, preferably at an average power level of from about 500 to about 2000 Watts. The laser may also operate in a pulse wave mode, preferably with a square-wave pulse and with a pulse duration of from about 0.3 to about 3 milliseconds, a pulse frequency of from about 50 to about 500 pulses per second, and a pulse intensity of at least about $3 \times 10^4$ Watts per square centimeter. The laser can remove material with cut depths of from about 0.020 inches to about 0.100 inches, permitting removal of 0.100 inches total material in 1–5 passes. More than 1 cubic centimeter of glass-ceramic material per minute is removed by this approach.

The laser machining technique may be used for some glass-ceramic articles without the need for further machining. However, for the case of radomes, the laser machining leaves a laser-affected surface layer that is removed by a final machining operation. The final machining is preferably accomplished by grinding at least about 0.002 inches from the laser-machined rough surface.

The presently preferred approach of laser machining with optimized control of the laser machining parameters results in process economics that are improved over those of the conventional approach, while producing an acceptable final article. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
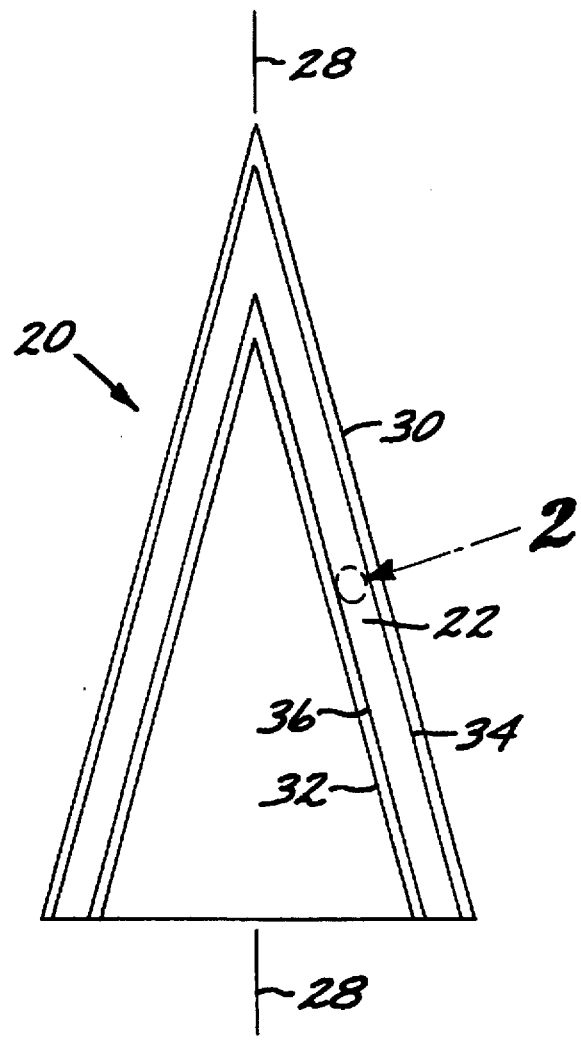
FIG. 1 is a sectional view of a portion of a glass-ceramic missile radome blank.
Figure 2:
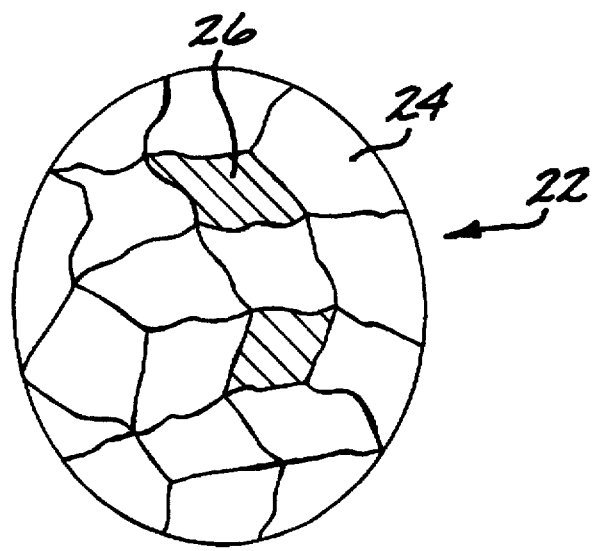
FIG. 2 is a microstructural view of the glass-ceramic material used in the radome blank of FIG. 1, in the region 2.

FIG. 1 depicts a glass-ceramic article, in this case a preferred radome blank 20. The radome blank 20 is cast from a glass-ceramic material such as Pyroceram™ material, manufactured by Corning Glass. A glass-ceramic material is a specific class of material that is a hybrid of ceramic and glassy phases but is distinct in its composition, structure, and behavior from either a pure ceramic or a pure glass. FIG. 2 illustrates the idealized microstructure of a typical glass-ceramic material 22. The glass-ceramic material includes grains 24 of crystalline phase and regions 26 of an amorphous phase. The crystalline grains 24 typically constitute about 90 percent by volume of the material 22, with the amorphous regions 26 being the remainder. The glass-ceramic material 26 has a composition that includes a glass former such as a silicate, and is typically a modified Mg,Al-silicate. The preferred Pyroceram™ 9606 material has a composition, in weight percent, of 56 percent $SiO_2$, 20 weight percent $Al_2O_3$, 15 percent MgO, and 9 percent $TiO_2$. When the glass-ceramic vaporizes, there is typically produced little if any volatile gas phase that forms a plasma above the solid.

The radome blank 20 is approximately cylindrically symmetric about a longitudinal axis 28. An outer surface 30 of the as-cast radome blank 20 is of generally good surface finish, shape, and symmetry, but typically not of the perfection required for an aerodynamic leading edge and outer surface of the final radome. An inner surface 32 of the radome blank 20 is of generally good shape and symmetry, but not of the perfection required for the inner surface of the final radome. The outer surface 30 and the inner surface 32 may also include regions of irregularly structured glass-ceramic material resulting from the casting procedure. A radar transceiver is enclosed by the final radome placed over the nose of the missile. The final inner and outer surfaces of the radome, as well as its material composition and structure, must be highly perfect to permit distortion-free sending and receiving of radar signals and be aerodynamically acceptable in the case of the outer surface. In order to attain the required degree of perfection, it is standard practice to remove an outer surface layer 34 and an inner surface layer 36, each about 0.100 inches thick, during fabrication. The preferred embodiment of the present invention is concerned with the removal of these surface layers 34 and 36.

Figure 3:
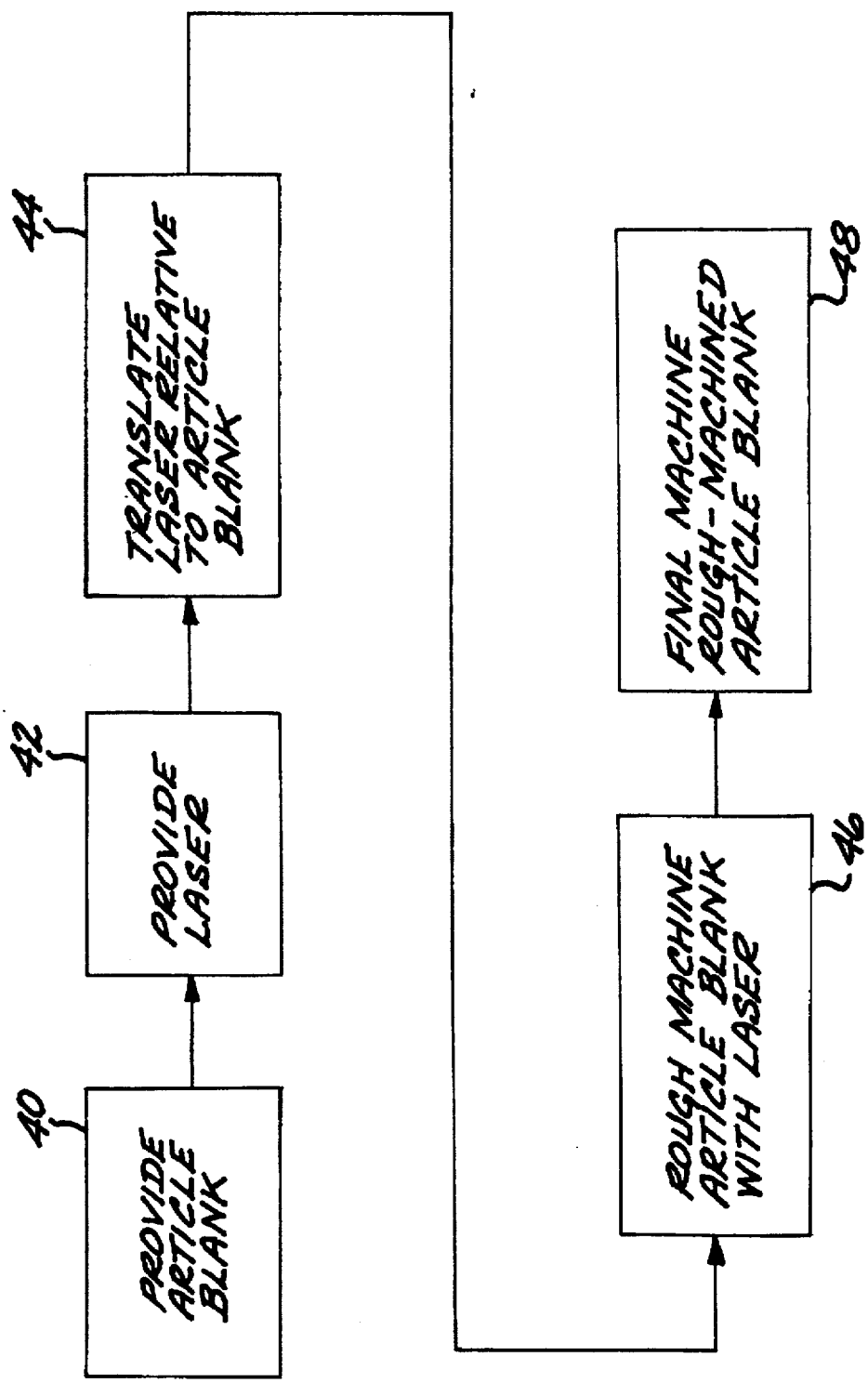
FIG. 3 is a block diagram of a method for fabricating the radome.

FIG. 3 depicts a preferred method for the pertinent machining aspects of the fabrication operation. An article blank is provided, numeral 40, made of a glass-ceramic material. In the preferred case, the article blank is the radome blank 20 of FIG. 1.

A high-power laser is provided, numeral 42. The laser preferably operates at a coherent light output of 1.06 micrometers, and is most preferably a Nd:YAG laser. (This specification of the type of laser follows the industry-standard convention. A "Nd:YAG" laser is a laser formed with a yttrium-aluminum-garnet (YAG) solid lasing element doped with neodymium (Nd).) Various lasers have been utilized during the development of the present invention, and the Nd:YAG laser operating at 1.06 micrometers has been found to provide the best results at the high power levels required for economic laser machining of these glass ceramics.

The laser is operated according to a set of operating parameters. The laser may be a continuous-wave (cw) laser or a pulsed laser. In either case, the energy delivered to the surface being machined is at least about 1850 Joules per square centimeter. If a continuous-wave laser is used, the average power of the laser ranges from about 500 to about 2000 Watts.

If a pulsed laser is used, the pulse is preferably a square wave pulse having a pulse duration of from about 0.3 to about 3 milliseconds, a pulse frequency of from about 50 to about 500 pulses per second, and a laser pulse intensity of at least about $3 \times 10^4$ Watts per square centimeter. The square wave pulse is preferred to avoid an elongated tail to the pulse that has been determined to result in excessive undesirable surface melting. The pulse duration of from about 0.3 to about 3 milliseconds permits a high power level to be delivered to the surface being machined, and represents an important distinction between some techniques for laser machining of ceramics (as distinct from glass-ceramics). For example, U.S. Pat. No. 5,138,130 teaches that ceramics containing volatile species that vaporize to produce a plasma must be machined with a Q-switched or excimer laser having pulses of much shorter duration in the microsecond or nanosecond ranges, thereby limiting the power delivered to the surface being machined.

Figure 4:
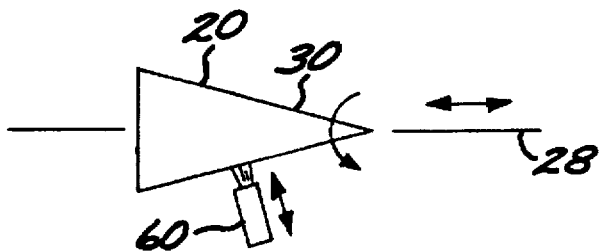
FIG. 4 is a schematic view of the laser rough machining of an outside surface of the radome blank.
Figure 5:
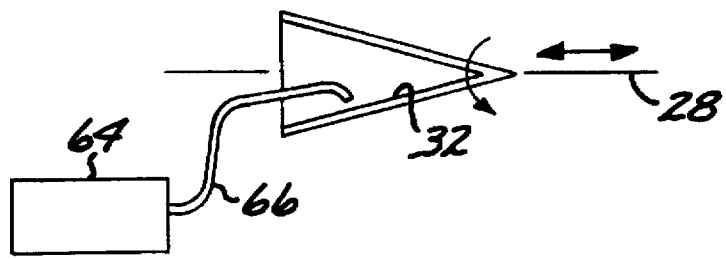
FIG. 5 is a schematic view of the laser rough machining of an inside surface of the radome blank.

The laser and the article blank are translated relative to each other, numeral 44. The approach to achieving the relative movement depends upon the nature of the article blank. FIGS. 4 and 5 illustrate the preferred approach for a laser 60 and the radome blank 20, with FIG. 4 relating to the machining of the outer surface 30 and FIG. 5 relating to the machining of the inner surface 32. In each case, the radome blank, which has at least approximately conical shape and symmetry, is rotated about its longitudinal axis 28 and simultaneously moved parallel to the longitudinal axis 28 by a support apparatus and fixturing (not shown). For external machining as in FIG. 4, the laser 60 is positioned so that a laser beam 62 produced by the laser 60 impinges approximately perpendicular to the outer surface 30. The laser 60 is spaced apart from the outer surface 30 by a distance determined by the focal length of the laser optics, which was about 4.5 inches in a preferred embodiment of the inventors. The laser 60 is mounted on a carriage (not shown) that permits it to move inwardly and outwardly relative to the outer surface 30 to maintain the desired distance. In the case of laser machining the inner surface 32, a laser 64 is positioned outside of the interior of the radome blank 20, and the energy of the laser is transmitted to the interior of the radome blank 20 by a series of mirrors and lenses, or, as shown, a light pipe or optical fiber bundle 66, supported on a support apparatus (not shown) that permits it to be moved to a desired location adjacent to the inner surface 32. The energy is preferably directed perpendicular to the inner surface 32. Desirably, the movements of the support apparatus of the radome blank and the laser support carriage are coordinated by a control mechanism (not shown) so as to maintain a controllable feed rate for the laser machining.

The radome blank 20 is rough machined using the laser, numeral 46. The feed rate of the radome blank 20 is preferably from about 100 to about 800 inches per minute. The depth of the laser cut-the depth of material removed in each pass—is preferably from about 0.020 to about 0.100 inches. The laser beam moves along the surface being machined in a helical pattern, with the rate of advance determining the degree to which adjacent passes overlap.

Figure 6:
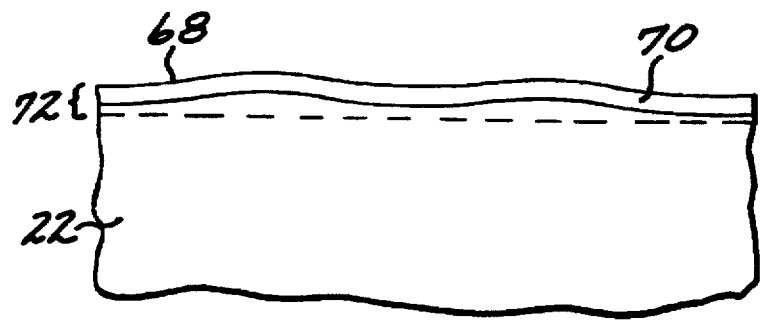
FIG. 6 is a schematic enlarged sectional view of the surface regions of a laser-machined glass-ceramic radome blank.
Figure 7:
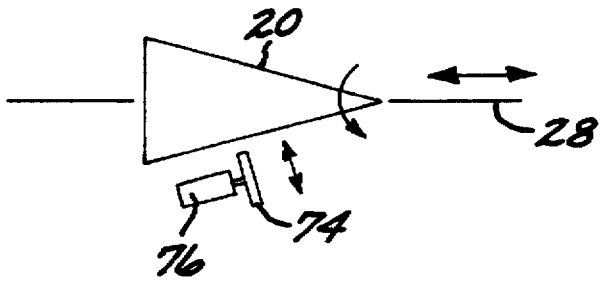
FIG. 7 is a schematic view of the final machining by grinding of the outside surface of the radome blank.

FIG. 6 schematically illustrates the glass-ceramic material near its surface 68 after the laser rough machining is complete. The surface 68 exhibits some surface roughness. Additionally, a modified region 70 is found at the surface 68. The region 70 is modified in two ways. First, a portion of the region exhibits a higher fraction of amorphous, glassy material than is usual. Second, there is a chemical change in the region 70.

The region 70 is typically about 0.002 inches thick, and is desirably removed in a final machining step 48. More preferably, the surface of the radome is machined to an aerodynamic smoothness by removing slightly more material as indicated by numeral 72, on the order of about 0.010 inches, in the final machining step.

Final machining 48 is accomplished by a technique other than the high-power laser machining used in the rough machining step 46. Preferably, the final machining of the radome blank 20 is accomplished by grinding using a carborundum or diamond grinding wheel 74 turned by a motor 76. In final machining, the radome blank is rotated about the longitudinal axis 28 and translated parallel to the longitudinal axis 28, and the grinding wheel and motor are translated so as to maintain the required positioning with respect to the radome blank. Removal of material by grinding in this final machining is fast because very little material is removed, and produces an aerodynamically smooth surface having the same structure and composition as the glass-ceramic material within the radome.

Figure 8:
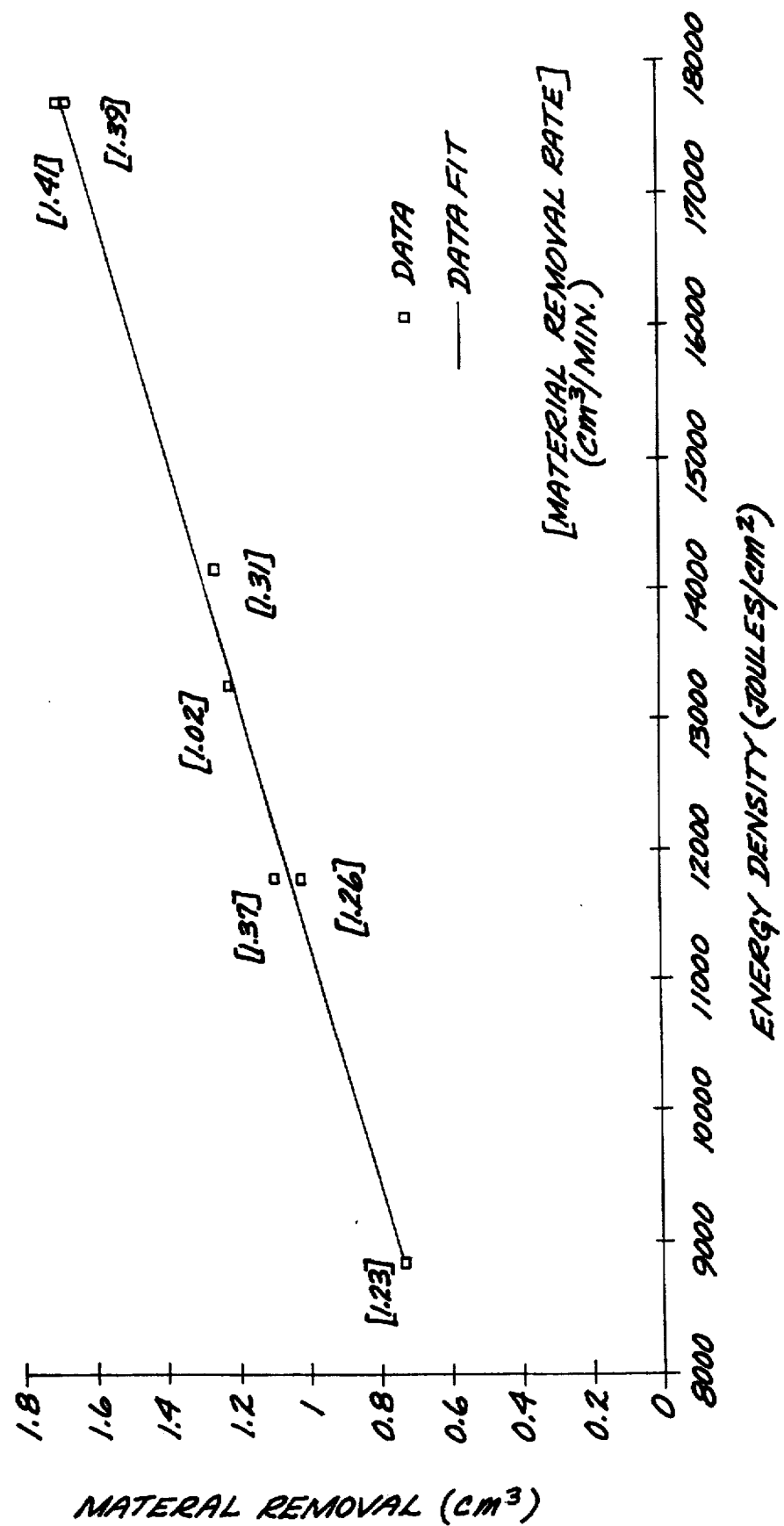
FIG. 8 is a graph of material removal as a function of laser energy density, with material removal rates also indicated.
Figure 9:
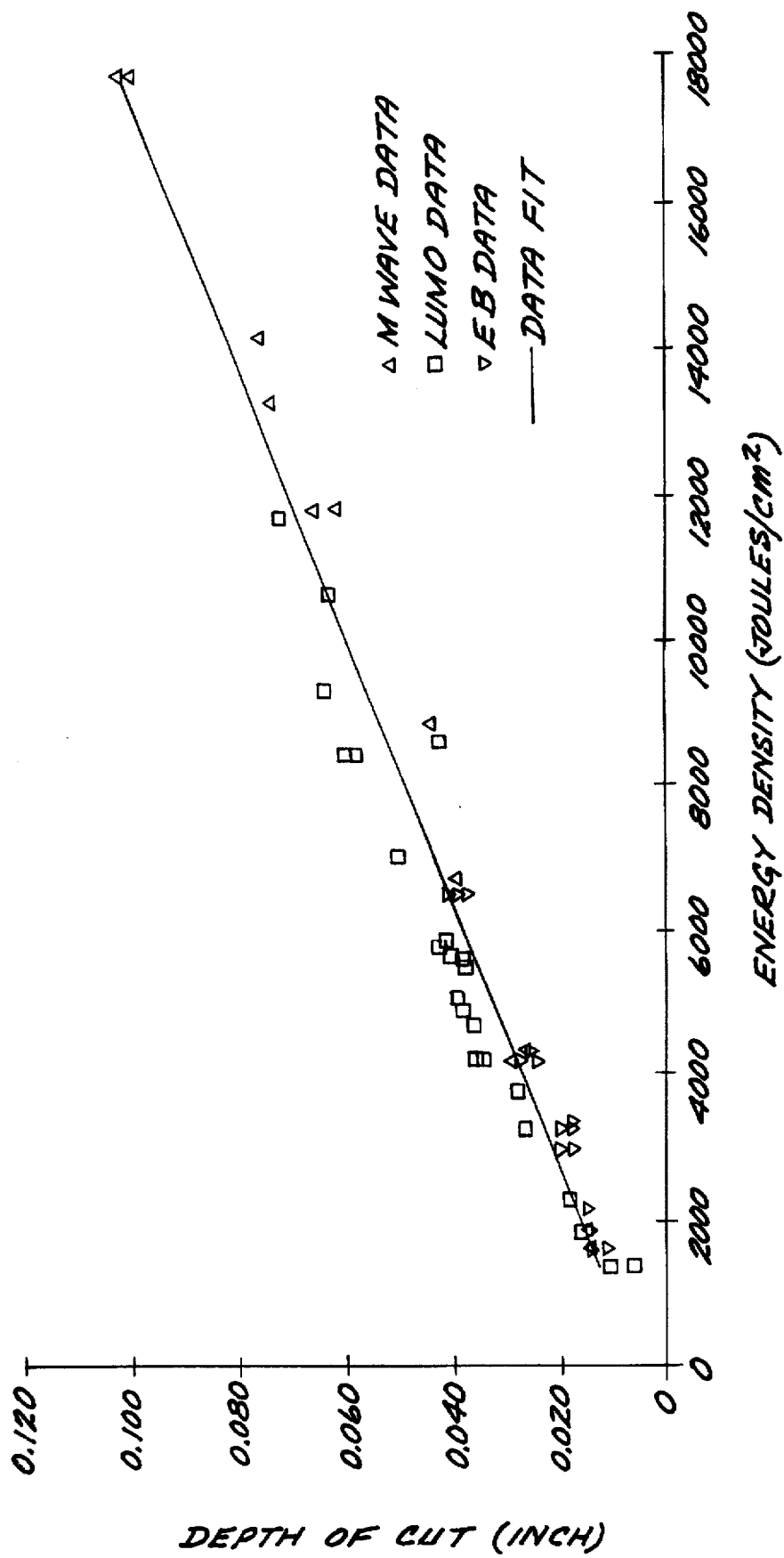
FIG. 9 is a graph of depth of cut as a function of laser energy density, for three types of Nd:YAG lasers.

The present invention has been reduced to practice with a radome of the type used on the Standard missile and test specimens. FIG. 8 illustrates material removal in cubic centimeters as a function of energy density of the laser beam, for a Lumonics MW2000 2 kW Multiwave laser. FIG. 9 is a plot of depth of cut in inches as a function of energy density for three different types of lasers used to machine the glass-ceramic: the Lumonics MW2000 2 kW Multiwave laser (mwave), a Lumonics JK704 400W laser (lumo), and a Raytheon 400W laser from EB Tech (EB). The data is substantially linear with energy density, despite the use of three types of lasers.

Chemical studies of the machined surface of Pyroceram glass-ceramic were performed by EDS. The modified region 70 produced by rough machining 46 showed enrichment of Al, Mg, and Ti relative to the base material glass ceramic. However, after about 0.002 inches of material was removed, corresponding to the final machining step 48, the surface composition was substantially the same as the base material glass ceramic.

For radome applications, the laser machining cannot adversely affect the dielectric properties of the glass ceramic, which would in turn adversely affect radar performance. To determine dielectric properties, two pieces of Pyroceram glass-ceramic, each about 1 inch×2 inches×0.250 inches, were laser machined on one broad face. Specimens were cut from the pieces near the laser-machined edge and near the center, where they would not be affected by the laser machining, as control specimens. The specimens were tested in an X-band transmission line and in a resonant cavity at either 8.28 or 7.6 GHz. The following table summarizes the dielectric constant ($\epsilon$) and loss tangent (tan $\delta$) results of the resonant cavity testing, where those results having no asterisk reflect testing at 8.28 GHz and those with an asterisk (*) reflect testing at 7.6 GHz.

TABLE I

| Specimen Identification | $\epsilon$ | tan $\delta$ |
| --- | --- | --- |
| #3 center-1 | 5.43 | 0.0005 |
| #3 center-2 | 5.43,5.47* | 0.0006,0.0005* |
| #3 edge-1 | 5.47* | 0.0005* |
| #4 center-1 | 5.45* | 0.0005* |
| #4 edge-1 | 5.44* | 0.0003* |

The results for the specimens taken near the laser-affected edge are comparable to those near the centers.

Thus, the present invention provides an improved approach for the machining of articles from glass-ceramics. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for fabricating a glass-ceramic radome, comprising the steps of:
   providing a radome blank made of a glass-ceramic, material and having a longitudinal axis, and further having an inside surface and an outside surface;
   providing a high-power laser utilizing a set of operating parameters;
   rotating the radome blank about the longitudinal axis at a rate of rotation corresponding to a feed rate;
   rough machining a rough-cut layer of the glass-ceramic material from a rough-machining surface of the radome using the high-power laser simultaneously with the step of rotating and with a point of application of a laser beam from the high-power laser traversing along the radome blank generally parallel to the longitudinal axis of the radome blank, the rough machining surface being selected from the group consisting of the inside surface and the outside surface of the radome blank, wherein the feed rate and the set of operating parameters of the high-power laser produce a material removal rate during the step of rough machining; and
   final machining glass-ceramic material from the rough-machining surface by a final machining technique other than the high-power laser machining used in the step of rough machining.

2. The method of claim 1, wherein the step of providing a radome blank includes the step of
   providing a radome blank made of a glass-ceramic material having a microstructure comprising a mixture of about 90 volume percent of ceramic crystals in a glassy matrix.

3. The method of claim 1, wherein the step of providing a radome blank includes the step of
   providing a radome blank made of a modified Mg,Al silicate composition.

4. The method of claim 1, wherein the step of providing a laser includes the step of
   providing a laser operating at about 1.06 micrometers wavelength.

5. The method of claim 1, wherein the step of providing a laser includes the step of
   providing a Nd:YAG laser operating in a continuous wave mode.

6. The method of claim 5, wherein the step of providing a laser includes the step of
   operating the Nd:YAG laser at an average power level of from about 500 to about 2000 Watts.

7. The method of claim 1, wherein the step of providing a laser includes the step of
   providing a Nd:YAG laser operating in a pulsed wave mode with a pulse duration of from about 0.3 to about 3 milliseconds, a pulse frequency of from about 50 to about 500 pulses per second, and a pulse intensity of at least about $3 \times 10^4$ Watts per square centimeter.

8. The method of claim 1, wherein the step of providing a laser includes the step of
   providing a laser operating in the pulsed wave mode with a square-wave pulse shape.

9. The method of claim 1, wherein the step of rough machining includes the step of
   rough machining the glass-ceramic layer at a material removal rate of at least about 1 cubic centimeter per minute.

10. The method of claim 1, wherein the step of rough machining includes the step of rough machining the rough cut layer to a depth of from about 0.020 inches to about 0.100 inches in a single pass.

11. The method of claim 1, wherein the step of final machining includes the step of mechanically grinding a final-machining layer at least about 0.002 inches thick of glass-ceramic material from the rough-machining surface.

12. A method for fabricating a glass-ceramic radome, comprising the steps of:

providing a radome blank made of a glass-ceramic material and having a longitudinal axis, and further having an inside surface and an outside surface;

providing a high-power Nd:YAG laser with a set of operating parameters comprising operating in a pulsed wave mode with a square wave pulse having a pulse duration of from about 0.3 to about 3 milliseconds, a pulse frequency of from about 50 to about 500 pulses per second, and a pulse intensity of at least about $3 \times 10^4$ Watts per square centimeter;

rotating the radome blank about the longitudinal axis at a rate of rotation corresponding to a feed rate of from about 100 to about 800 inches per minute;

rough machining a rough-cut layer of the glass-ceramic material from a rough-machining surface of the radome using the high-power, Nd:YAG laser simultaneously with the step of rotating and with a point of application of a laser beam from the high-power laser traversing along the radome blank generally parallel to the longitudinal axis of the radome blank, the rough machining surface being selected from the group consisting of the inside surface and the outside surface of the radome blank, wherein the feed rate and the set of operating parameters of the high-power Nd:YAG laser produce a material removal rate of at least about 1 cubic centimeter per minute during the step of rough machining; and final machining glass-ceramic material from the rough-machining surface by mechanically grinding a final-machining layer at least about 0.002 inches thick of glass-ceramic material from the rough-machining surface.

13. The method of claim 12, wherein the step of rough machining includes the step of rough machining the rough cut layer to a depth of from about 0.020 inches to about 0.100 inches in a single pass.

14. A method for fabricating an article of a glass-ceramic material, comprising the steps of:

providing a blank made of a glass-ceramic material;

providing a high-power Nd:YAG laser operating with a set of operating parameters comprising a pulsed wave mode with a square wave pulse having a pulse duration of from about 0.3 to about 3 milliseconds, a pulse frequency of from about 50 to about 500 pulses per second, and a laser pulse intensity of at least about $3 \times 10^4$ Watts per square centimeter; and machining a layer of the glass-ceramic material from a surface of the blank using the high-power laser and with a point of application of a laser beam from the high-power Nd:YAG laser traversing relative to a surface of the blank at a feed rate, wherein the feed rate and the set of operating parameters of the high-power laser produce a material removal rate during the step of machining.

15. The method of claim 14, wherein the step of machining includes the step of establishing a feed rate of from about 100 to about 800 inches per minute.

16. The method of claim 14, wherein the step of machining includes the step of establishing a material removal rate of at least about 1 cubic centimeter per minute.

17. The method of claim 14, including an additional step, after the step of machining, of final machining the surface of the blank to remove at least about 0.002 inches of glass-ceramic material from the surface.

18. The method of claim 14, wherein the step of providing a blank includes the step of providing a radome blank.

* * * * *